United States Patent [19]

Buch

[11] Patent Number: 5,669,002

[45] Date of Patent: Sep. 16, 1997

[54] MULTI-PROCESSOR RESOURCE LOCKING MECHANISM WITH A LOCK REGISTER CORRESPONDING TO EACH RESOURCE STORED IN COMMON MEMORY

[75] Inventor: Bruce D. Buch, Westborough, Mass.

[73] Assignee: Digital Equipment Corp., Maynard, Mass.

[21] Appl. No.: 569,555

[22] Filed: Dec. 8, 1995

Related U.S. Application Data

[63] Continuation of Ser. No. 305,510, Sep. 13, 1994, abandoned, which is a continuation of Ser. No. 204,896, Mar. 2, 1994, abandoned, which is a continuation of Ser. No. 546,037, Jun. 28, 1990, abandoned.

[51] Int. Cl.⁶ .................... G06F 12/02; G06F 12/14; G06F 15/167
[52] U.S. Cl. ............. 395/726; 395/200.43; 395/200.59; 711/150
[58] Field of Search ..................... 395/726, 288, 395/856, 200.08, 477, 650, 728, 729

[56] References Cited

U.S. PATENT DOCUMENTS

| | | | |
|---|---|---|---|
| 4,320,451 | 3/1982 | Bachman et al. | 395/650 |
| 4,380,798 | 4/1983 | Shannon et al. | 395/729 |
| 4,488,217 | 12/1984 | Binder et al. | 395/375 |
| 4,574,350 | 3/1986 | Starr | 395/325 |
| 4,594,657 | 6/1986 | Byrns | 395/729 |
| 4,719,569 | 1/1988 | Ludemann et al. | 395/729 |
| 4,744,023 | 5/1988 | Welsch | 395/200.13 |
| 4,754,398 | 6/1988 | Pribnow | 395/200.06 |
| 4,780,822 | 10/1988 | Miller | 395/729 |
| 4,805,106 | 2/1989 | Pfeifer | 395/650 |
| 4,965,718 | 10/1990 | George et al. | 395/425 |
| 4,965,719 | 10/1990 | Shoens et al. | 395/650 |
| 5,068,781 | 11/1991 | Gillett et al. | 395/325 |
| 5,073,855 | 12/1991 | Staplin et al. | 395/375 |
| 5,115,499 | 5/1992 | Stiffler et al. | 395/425 |
| 5,142,676 | 8/1992 | Fried et al. | 395/425 |
| 5,263,161 | 11/1993 | Barth et al. | 395/650 |

OTHER PUBLICATIONS

Shaefer et al., "Program Confinement In KVM/370", Proceedings of the 1977 ACM Annual Conference, Oct. 16–19, 1977, pp. 404–410.

Loepere, "The Covert Channel Limiter Revisited", Operating Systems Review (SIGOPS), Apr. 23, 1989, New York, pp. 39–44.

*Primary Examiner*—Thomas C. Lee
*Assistant Examiner*—D. Dinh
*Attorney, Agent, or Firm*—Fish & Richardson, P.C.

[57] ABSTRACT

A method and apparatus to reduce bus usage and to increase resource locking protocol compatibility within a heterogeneous processing environment. Lock indicators are maintained in stores designated as lock registers and access to a resource is gained by any processor depending upon the status of a lock register associated with that resource. Access to a locked resource is barred to all but the locking processor, and only the processor which has set a lock can use or release that locked resource. A lock register controller controls the contents of the lock registers. A given processor P1–PN is identified by a unique ID vector G1–GN. These vectors are used to indicate both that a resource is locked and to indicate the identity of the locking processor. An unlocked resource is identified by a status vector (GØ). In a preferred embodiment, acquisition of exclusive access to an available resource is obtained with a simple read command; release of exclusive access is achieved with a simple write executed by the processor which has set the lock. By convention, processors will not access a resource requiring exclusive access until an inquiry of the associated lock register returns the GØ vector to the inquiring processor.

45 Claims, 6 Drawing Sheets

FIG. 5(a)    PRIOR ART READ-MODIFY-WRITE LOCKING MECHANISM

| TIME INTERVAL: | 1 | 2 | 3 | 4 |
|---|---|---|---|---|
| BUS STATUS: | ACCESSED BY INQUIRING PROCESSOR | SUSPENDED WHILE INQUIRING PROCESSOR TESTS | ACCESSED BY INQUIRING PROCESSOR | RELEASED (OR SOUGHT RESOURCE IS ACCESSED |
| ACTION TAKEN: | READ COMMAND ISSUED BY INQUIRING PROCESSOR AND CONTENTS OF GIVEN LOCK REGISTER ARE READ BY THE INQUIRING PROCESSOR. | RECEIVED CONTENTS OF LOCK REGISTER ARE TESTED; IF INDICATE LOCKED RESOURCE, BUS IS RELEASED AND PROCESSOR RETRIES LATER. IF INDICATE UNLOCKED RESOURCE, RECEIVED CONTENTS ARE MODIFIED TO A LOCKED STATUS INDICATION. | MODIFIED DATA WRITTEN INTO THE LOCK REGISTER TO INDICATE LOCKED RESOURCE. | |

FIG. 5(b)  READ LOCKING MECHANISM

| TIME INTERVAL: | 1 | 2 | 3 | 4 |
|---|---|---|---|---|
| BUS STATUS: | ACCESSED BY INQUIRING PROCESSOR | RELEASED (OR SOUGHT RESOURCE IS ACCESSED) | | |
| ACTION TAKEN: | READ COMMAND ISSUED BY THE INQUIRING PROCESSOR, CONTENTS OF THE ADDRESSED REGISTER ARE PLACED ON BUS BY LOCK REGISTER CONTROLLER, THE CONTENTS ARE READ BY THE INQUIRING PROCESSOR (GØ MEANS THE INQUIRING PROCESSOR NOW HAS EXCLUSIVE ACCESS), AND THE PROCESSOR'S ID VECTOR IS WRITTEN BY THE LOCK REGISTER CONTROLLER INTO THE LOCK REGISTER (IF THE RESOURCE WAS NOT LOCKED). | RECEIVED CONTENTS OF LOCK REGISTER ARE TESTED WITHIN THE INQUIRING PROCESSOR, WHICH ACTS ACCORDINGLY. | | |

MULTI-PROCESSOR RESOURCE LOCKING MECHANISM WITH A LOCK REGISTER CORRESPONDING TO EACH RESOURCE STORED IN COMMON MEMORY

This is a continuation of application Ser. No. 08/305,510, filed Sep. 13, 1994, now abandoned which is a continuation of application Ser. No. 08/204,896, filed on Mar. 2, 1994, now abandoned which is a continuation of application Ser. No. 07/546,037, filed Jun. 28, 1990, now abandoned.

BACKGROUND OF THE INVENTION

The present invention relates to controlling processor access to resources which must be exclusively accessed in a multiprocessor environment.

Systems of multiple processors often share common resources, such as records in memory, specialized registers, indicators, etc. Such systems normally require a mechanism whereby a given processor can indicate the need to temporarily reserve or "block" a resource from use or modification by other processors. This locking insures exclusive access to that resource for the given processor.

For example, a given processor may need to make a number of individual modifications to a data structure in a memory to bring that data structure from one valid state to another. A lock can be used to indicate to other processors during modification of the data structure that the data structure should not be accessed. This mechanism requires that processors obey a policy in which the state of a lock is inspected before the associated resource is accessed. The process of inspecting a lock, and setting it to the locked state if found to be presently unlocked, must be done "atomically" i.e. without any intervening operations from other processors, and is conventionally called a "read_modify-write" operation. This atomicity is required to insure that no more than one processor at a time "owns" a given lock.

A processor seeking exclusive use of a resource typically will issue a read command having the address of a lock indicator associated with that resource. The contents of the addressed lock indicator are put on an address/data bus to be read by the seeking processor. Simultaneously, a mechanism, typically suspension of bus usage, is invoked to temporarily suspend access to the addressed resource by all other processors.

The seeking processor inspects the lock indicator data it reads on the address/data bus to determine the locked/unlocked status of the resource of interest. If, according to the contents of the lock indicator, the resource is indicated to be locked, then the seeking processor must presently release the address/data bus and may re-examine the lock indicator at a later time. Alternatively, if, according to the contents of the lock indicator, the resource is indicated to be unlocked, then the seeking processor modifies the lock indicator contents with a write command communicated over the address/data bus to indicate that the resource is reserved for exclusive access by the seeking processor. The processor is now said to have "acquired" the lock. The seeking processor, now as the locking processor, can exclusively process or modify the data in the now locked resource as needed.

When the locking processor no longer needs exclusive access to the resource, it will issue a write command directed to the resource's associated lock indicator to clear the lock indication. This is called "relinquishing" the lock. Now the resource is available for access by other processors, or can be locked for exclusive access by another processor executing the process detailed above.

SUMMARY OF THE INVENTION

The present invention reduces address/data bus usage by eliminating suspension of bus usage for lock inspection and acquisition and increases resource locking protocol compatibility within a heterogeneous processing environment. A locked/unlocked indication is maintained in a lock register associated with a given resource, and the permission of a processor to access the resource is indicated by the contents of the lock register. A lock register is inspected and, if unlocked, the lock is acquired with a simple read operation. A lock can be relinquished only by the locking procesor, and is done with a simple write operation.

A given processor (P1–PN) is identified by a unique ID vector (G1–GN). These vectors are used by the mechanism which arbitrates bus usage in the multiprocessor system to identify processors, and in the present invention to indicate both that a resource is locked and to indicate the locking processor. An unlocked state is identified by another vector (GØ). By convention, processors will not access a resource requiring exclusive access until an inquiry of the associated lock register returns the GØ vector. This protocol is employed throughout the present invention.

Locking of a given resource is achieved by an inquiring processor addressing a single read command to a lock register associated with that resource. Upon this inquiry, a lock register controller recognizes the addressed lock register and latches the reading processor's ID vector. At the same time (i.e., before the next bus usage), the lock register controller reads the addressed lock register and returns its contents on the address/data bus to indicate the locked/unlocked status of the resource. If the value returned is an ID vector associated with another processor, then the associated resource is considered to be already locked and the reading processor accordingly interprets this vector data as meaning that the indicated other processor "owns" the resource. The reading processor now goes on to other tasks or tries again.

If the value returned is the unlocked status vector, the processor interprets this as an indication that the resource was not owned, and also that it now exclusively owns the resource. At the same time (i.e., before the next bus usage), the lock register controller writes the ID vector of the inquiring processor (from the lock register controller latch) into the lock register. This establishes exclusive ownership of the resource by that inquiring processor. Thus subsequent inquiry directed to that same lock register by another processor will return the node ID of the inquiring (now locking) processor, and the other processor will likewise go on to other tasks.

The locking processor indicates its desire to terminate exclusive access to a resource by addressing the associated lock register with a simple write command. In response, the lock register controller having latched the locking (now unlocking) processor's ID vector when the write operation began, fetches the contents of the lock register. The controller writes the unlocked status vector (GØ) into that lock register to unlock that locked resource only if the latched vector and fetched vector match, thereby insuring that only the processor that locked the resource can unlock it.

The present invention eliminates the need for an atomic read_modify-write lock/unlock operation to be performed upon the lock register data structure. In a typical read_modify-write operation, the contents of a particular lock register are read and evaluated by a processor, and then the processor (if the particular lock register is unlocked) writes a "lock" command to that lock register (with bus suspension during the evaluation process) to lock access to the resource associated with that lock register. The present invention uses only a simple read or write command for resource locking or unlocking in conjunction with the disclosed apparatus. The present invention thus advantageously reduces usage (and suspensions of usage) of the address/data bus.

Other advantages and features will become apparent from the following description of the preferred embodiment and from the claims.

BRIEF DESCRIPTION OF THE DRAWINGS

FIG. 5 (a,b) is a comparison of a prior art read_modify-write operation versus the present invention.

DESCRIPTION OF A PREFERRED EMBODIMENT

In a preferred embodiment of the present invention, any one of several processors may (in turn) acquire exclusive access to a given resource (such as to a memory record) by issuing a read command and may release exclusive access by issuing a write command, such as in the manner summarized above. Each processor, P1–PN, is assigned a unique node ID vector G1–GN. The status vector (GØ) corresponds to none of the processors P1–PN, and is used to indicate an unlocked resource. The ID vectors are used by a lock register controller to indicate the locked/unlocked status of a lock register which is associated, by a predetermined convention, with a given resource. A lock register controller controls an array of lock registers which may be an array of storage registers distinct from any other system memory, or an area in system memory specifically partitioned for use as a lock register array. The lock register controller may be incorporated on a single substrate with a memory controller which controls access to system memory.

Figure 1:
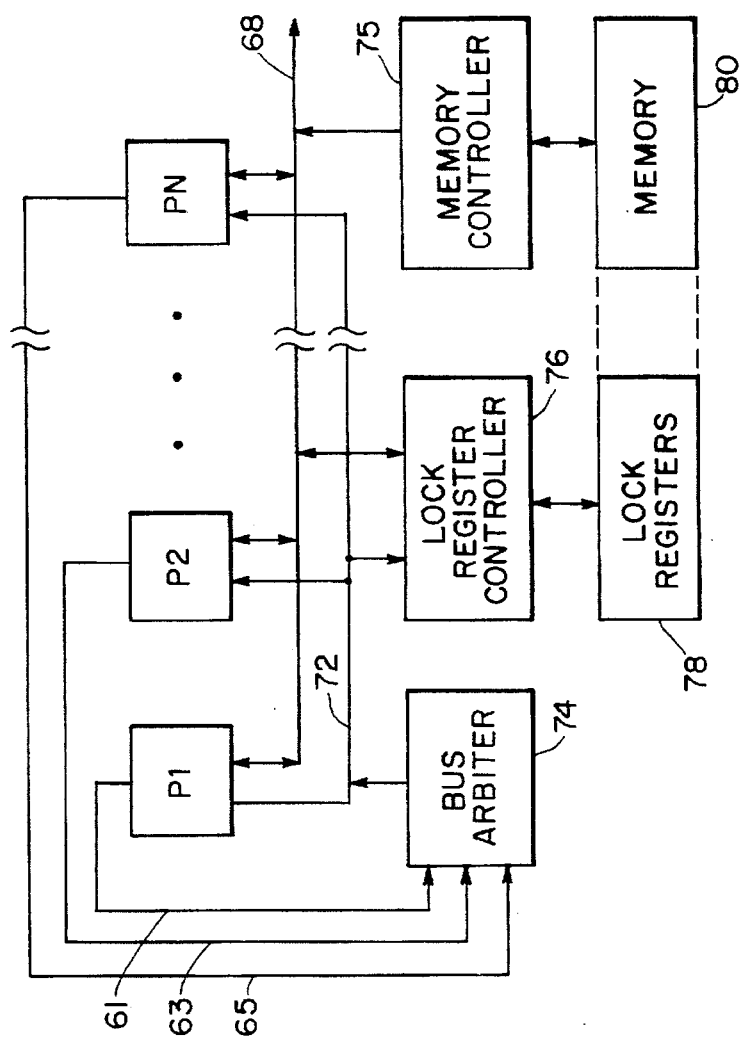
FIG. 1 is a block diagram of a preferred embodiment of the invention.

In the embodiment of FIG. 1, processors P1, P2 ... PN, are coupled via request lines 61, 63 ... 65 to a bus arbiter 74. Bus arbiter 74 determines which processor is to have access to the data bus 68 and issues that processor's node ID on the grant bus 72. The processor whose node ID appears on the grant bus is thus granted access to the address/data bus 68 and may now address and access various resources, such as a record in memory 80 via memory controller 75. (The method of bus arbitration used by bus arbiter 74 is a matter of computer design outside of the present inquiry; the present invention is directed to actions of a processor after it has been awarded bus access by arbiter 74.)

Permission to access a resource such as a record in memory 80 is indicated to an inquiring (reading) processor via lock register controller 76 according to the contents of the particular lock register of array 78 assigned to the sought resource. Controller 76 is preferably provided with a latch for storing the node ID of a processor accessing the lock register array from grant bus 72.

Figure 2:
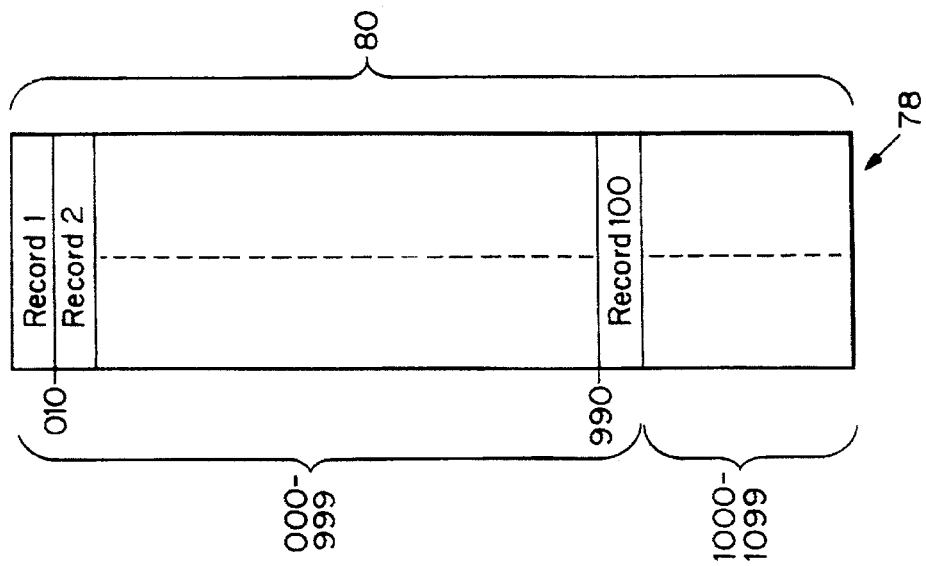
FIG. 2 is a map of a lock register array as part of a memory store.

An illustrative relationship between lock registers and memory records in practice of the present invention is shown in FIG. 2. In this example, memory 80 includes 100 records and 100 lock registers, the latter constituting a lock register array 78. Each memory record (1–100) consists in this example of 10 consecutive locations within the overall range of addresses 000–999 (e.g., record 1 corresponds to locations 000–009, etc.). The lock registers are established at locations 1000–1099. Now lock register address 1000 corresponds to record 1, lock register address 1001 corresponds to record 2, etc.

Any one of these 100 records (as a resource) might be read and modified by any given processor. To avoid corruption from concurrent modification by several processors, the present locking mechanism is employed. Hence, before accessing a given record, the contents of a lock register associated with the given record are read by the inquiring processor. If the lock register contains a node ID vector (G1–GN), then by convention, the record associated with that register has been locked by the processor associated with that vector, and the inquiring processor respects this condition by going on to other tasks or retrying to obtain access later.

If the lock register contains the unlocked status vector (GØ), then by convention, this is interpreted by an inquiring processor that it has locked an unlocked resource associated with that lock register. Upon such inquiry, the lock register controller writes the node ID vector of the inquiring processor into the lock register to indicate that the inquiring processor has acquired exclusive access to the record. In particular, the lock register controller latches the grant ID from the grant bus when the read begins, then outputs on the address/data bus the contents of the addressed lock register, and conditionally stores the ID of the inquiring processor into the addressed lock register as the prior contents are placed onto the bus. This is done within the time frame of a normal procesor read operation.

A vector returned from the lock register other than GØ indicates to the inquiring processor that the resource is locked by another processor and also the identity of the locking processor. If the resource is locked by a processor other than the inquiring processor, then lock register controller 76 does not modify the contents of the addressed lock register.

The lock is released within the time frame of a normal write routine by the processor issuing a write command (which may specify (GØ) as the data to be written) to the lock controller. The lock register controller latches the processor's ID vector from the grant bus 72, recognizes the address, fetches the contents of the addressed lock register and compares these contents to the processor's node ID vector. In the case where the node ID matches the value stored in the lock register, the lock register controller causes the addressed lock register to be written with GØ; otherwise, the register contents are not changed. This insures that only the proper locking processor relinquishes a lock.

In one preferred embodiment, the lock register controller writes into the lock register whatever data is issued by the processor as part of its write command, and assumes all processors will by convention supply GØ as that data. In another preferred embodiment, the lock register controller writes the GØ vector into the addressed lock register regardless of the actual vector data issued by the processor with such write commands (and therefore the write data is not latched by the controller).

In operation of the embodiment of FIG. 1, an inquiring processor seeking exclusive access to a resource (such as a record in memory 80) issues a request by putting on the data bus 68 a read command addressed to the lock register in array 78 associated with the resource of interest (such as a record in memory 80). The lock register controller 76 decodes the address and fetches the data (indicative of locked/unlocked status) stored in the associated lock register and puts this data (GØ or one of G1–GN) on the data bus 68. The inquiring processor reads the vector data and immediately knows the status of the resource of interest and can immediately begin operation upon the contents of the locked resource if GØ is the read vector data. At the same time, the lock register controller having latched the contents of the grant bus 72 indicative of the inquiring processor's node ID, then writes this into the addressed lock register to "set" the lock (if GØ has been fetched by the lock register controller from the lock register). If GØ is not read on the data bus, then the inquiring processor knows that it has been denied access to the resource.

In the case where the node ID of a processor issuing a write command to a lock register (to release exclusive access) matches the value stored in the lock register, then the lock register controller clears the lock by writing GØ into the addressed lock register. In the case that the writing processor's node ID does not match the value stored in the addressed lock register, then that processor cannot rightfully clear the lock, and accordingly, the lock register controller performs no modification of the addressed lock register. In one preferred embodiment of the invention, the lock register controller simply ignores inappropriate write commands. In an alternative preferred embodiment, the lock register controller flags an error condition to report that a processor unconventionally attempted to modify a lock.

Figure 3:
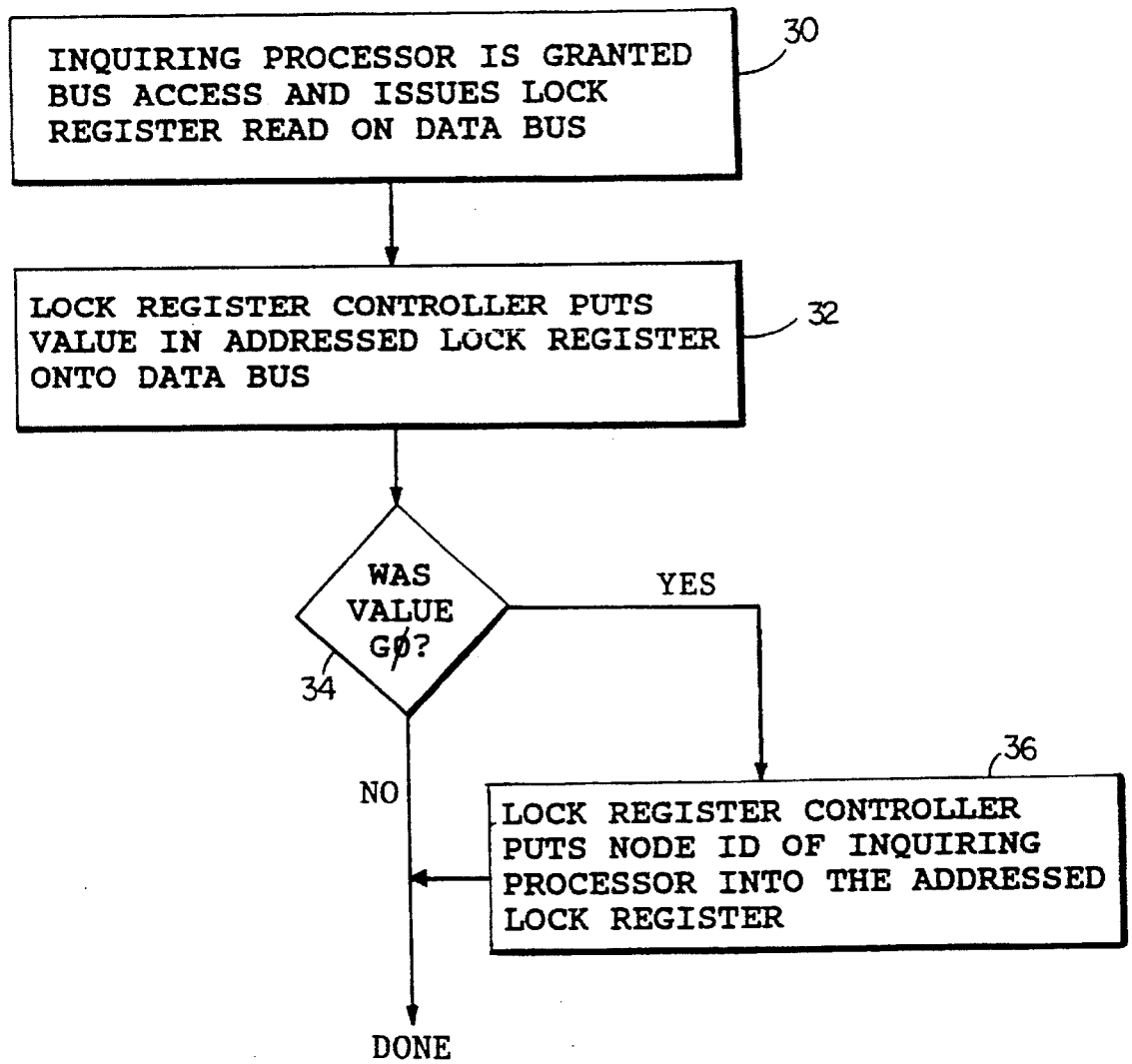
FIG. 3 is a flow chart showing the acquisition of exclusive access by setting a resource lock in practice of the present invention.
Figure 4:
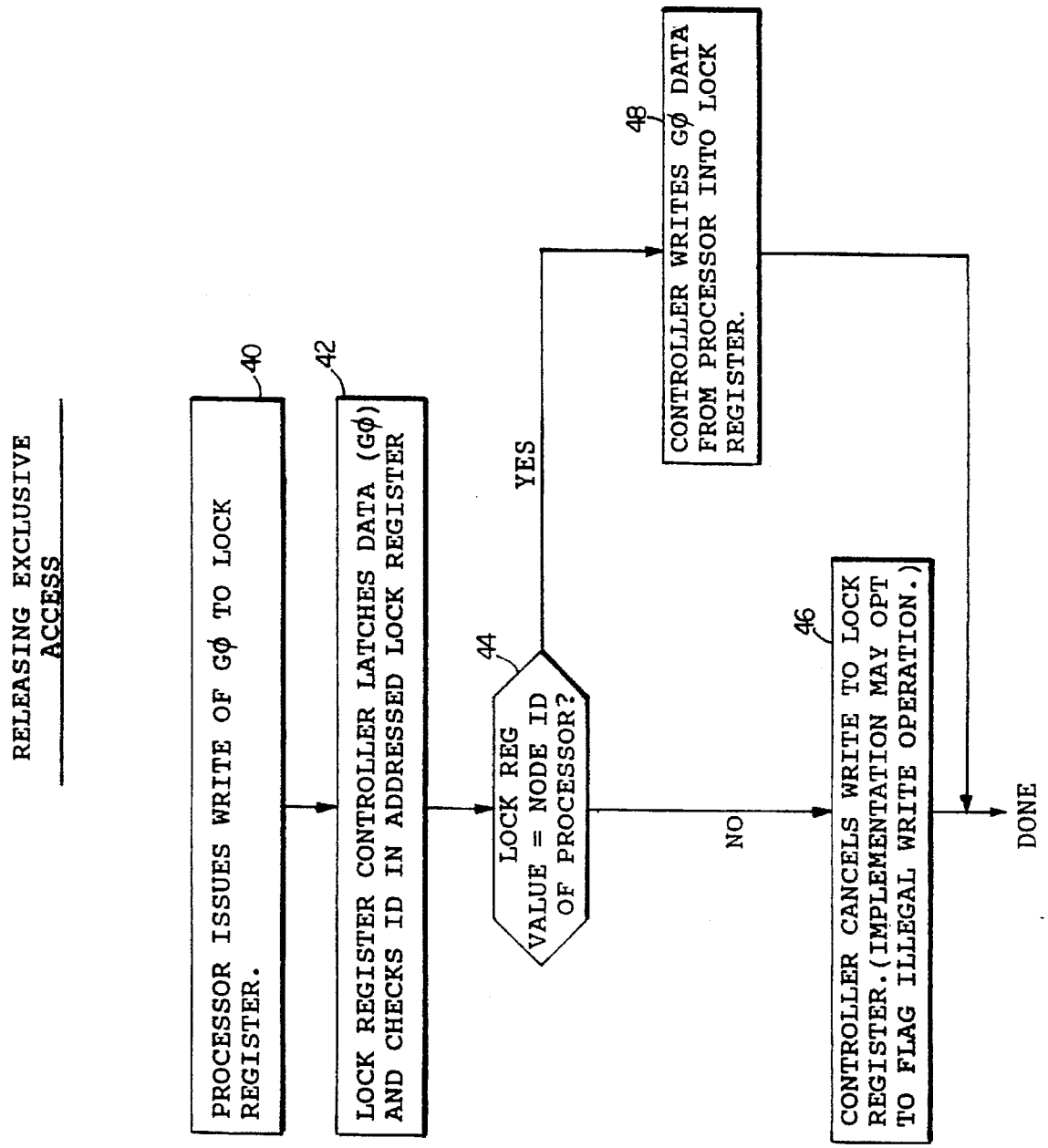
FIG. 4 is a flow chart showing releasing of exclusive access to a resource in practice of the present invention.

FIGS. 3 and 4 are flow charts showing acquisition and relinquishment of a lock, respectively. In FIG. 3, access to the data bus is granted by the bus arbiter and the designated processor then puts the address of a lock register associated with a sought resource on the data bus (block 30). Now the lock register controller reads the address and puts the contents of the addressed lock register onto the data bus (block 32). If the value is not GØ, indicating an already locked resource, then this loop is complete (block 34). If the value is GØ, then the lock register controller puts the node ID of the inquiring processor in the addressed lock register (block 36), and then the routine is complete. The inquiring processor has now acquired exclusive access to the sought resource, and can proceed accordingly.

As shown in FIG. 4, to relinquish a lock, access to the data bus is granted by the bus arbiter and the processor having the lock issues a write (GØ) to the lock register associated with the locked resource (block 40). The lock register controller recognizes the address, latches the data (GØ) and fetches the contents of the addressed lock register (block 42). The controller tests for a match of the node ID vector (from grant bus 72) of the processor issuing the write and the vector fetched from the addressed lock register (block 44). If the vectors do not match, then no changes are made in the lock register since the inquiring processor does not own that resource, and the controller cancels the write (block 46). But if the ID' match, then the controller writes GØ into the lock register (block 48) and the exclusive access is thus terminated.

The present invention reduces data bus usage and suspensions. As shown in FIG. 5a, a prior art read_modify-write locking mechanism requires a combination of bus usage and suspension of usage for three time intervals 1, 2, 3 in order to set a lock. First, a read command is issued by the inquiring processor and the contents of the addressed lock register are read by the inquiring processor (interval 1: bus usage). Next, if not indicative of locked status, the lock register contents state is modified to indicate locked status (interval 2: bus suspension). Finally, the modified contents statement is written back to the lock register to lock access to the sought resource (interval 3: bus usage).

As shown in FIG. 5b, the new resource locking mechanism of the present invention uses only one time interval of data bus time for a processor to lock a resource with a simple read operation (interval 1: bus usage). The lock register controller returns the unlocked indicator as read data to the inquiring processor within this interval and then writes the inquiring processor's node ID in the addressed lock register. As a result, bus usage is reduced and suspensions are avoided. The present invention is equally as efficient in releasing a lock, merely requiring addressing a write statement to the appropriate lock register.

Figure 6:
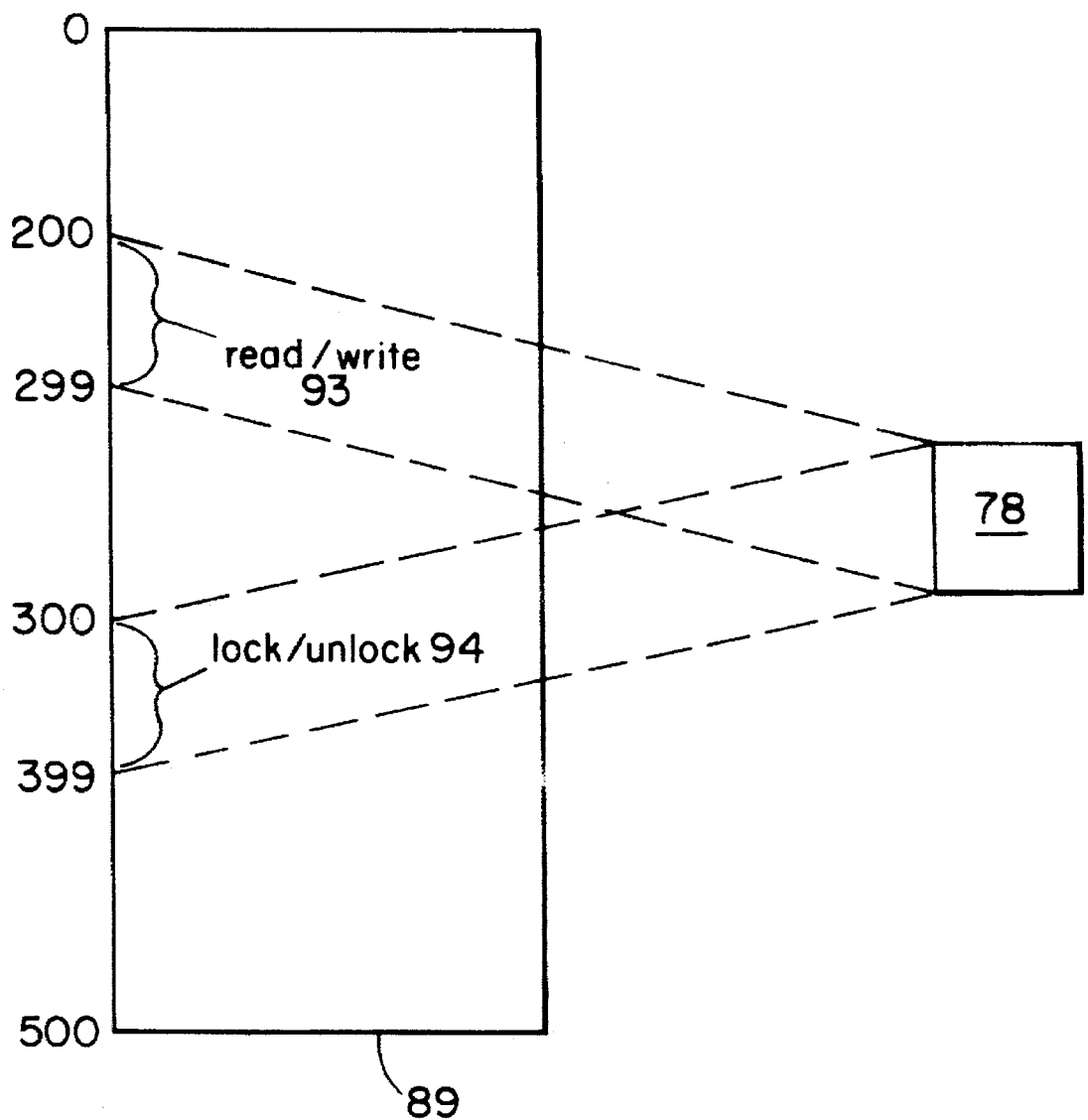
FIG. 6 is a diagram of a doubly mapped lock register array in practice of the present invention.

In a preferred embodiment of the invention, for a given set of lock registers, the lock register controller associates two addresses with each register. As shown in the example of FIG. 6, two areas of illustrative memory 89 are respectively identified as the "read-write" segment 93 (here assigned addresses 200–299) and the "lock/unlock" segment 94 (here assigned addresses 300–399). The lock/unlock segment 94 can be used for the general locking/unlocking operations discussed above. The read-write segment 93 can be used to load a lock register or to inspect the state of a register without causing modification; this type of access would typically be used for initialization, diagnosis, or controlling access given to "restricted" nodes.

For example, a "trusted processor" may have the ability to change the state, i.e. ownership, of a lock it does not itself own. This ability becomes important if, for example, a processor which owns the lock becomes disabled and can not release the lock. Without the capability of some other processor being able to change the state of the resource to unlocked, no other processor could acquire the resource, even though the processor which originally locked the resource is no longer functioning. Further, the ability of a "trusted processor" to inspect a lock without changing the state of the system or to unconditionally modify a lock is important for the diagnosis of system malfunctions and for the resolution of deadlock situations between processors maintaining locks.

The present invention has several advantages, including:

(1) Since locks may be tested and conditionally acquired with simple operations, these operations can be executed much more expeditiously than conventional read_modify-write methods. Bus usage and suspension is reduced.

(2) Since this technique uses conventional memory read (and write) operations to perform lock testing, acquisition and release, it is not dependent on any particular processor's mechanism for performing read_modify-write operations, i.e., no special operation or signalling is required to be implemented by processors to use this feature. Hence, this technique is applicable to a variety of processor types, and to heterogeneous mixtures of processors in a multiprocessor system.

(3) Since the value used to indicate that a processor "owns" a lock is that processor's own node ID vector, and lock registers can be benignly read via the read-write segment 93, it is possible to get a system-wide picture of which processors have locked the various resources in a system without changing that picture. This aids diagnosis of system deadlocks, etc.

Other embodiments are within the following claims.

What is claimed is:

1. In a computer system operable with two processors couplable via a communication bus to a plurality of lock registers, the processors and registers couplable via the bus to a resource, such resource comprising a plurality of stored records each one of which can be indicated as locked for exclusive use, and the lock register addressable by an address unique to the lock register on the bus, a method for indicating locked status of each one of the plurality of stored records, the method comprising the steps of:

(a) associating each one of the lock registers with a corresponding one of the stored records, such lock registers and records stored in a common memory coupled to the communication bus;

(b) assigning or denying exclusive use of the stored record to a given one of the processors depending on whether the stored record is unlocked or locked at the time the given processor issues a read command via the bus to the unique address of the lock register, and (c) indicating a locked status in the lock register and, if locked by a processor other than the given processor, returning from the lock register to the given processor an indication that the stored record is locked by the other processor, such that, without further commands from the given processor, the stored record is indicated to be available for use only by the given processor.

2. The method of claim 1 wherein step (c) is preceded with interposing a lock register controller between the lock register and the bus.

3. The method of claim 2 wherein step (c) further includes the lock register controller receiving the read command, responsively reading the contents of the lock register, causing the locked indicator to be put in the lock register and communicating to the given processor via the bus that the resource is assigned to the given processor for exclusive use.

4. The method of claim 2 wherein each of the plurality of processors is assigned a unique node ID indicator.

5. The method of claim 2 wherein the locked or unlocked status of the resource is indicated by the lock register controller with a status indicator.

6. The method of claim 4 wherein the lock register controller writes the node ID indicator of the given processor in the lock register as the locked indicator to indicate that the given processor has locked the resource.

7. The method of claim 5 wherein the resource is indicated to be locked by the given processor by the lock register controller placing the unlocked status indicator on the bus in response to the read command.

8. The method of claim 5 wherein the resource is indicated to be unlocked, this indication being made by the lock register controller deleting the locked indicator in the lock register.

9. The method of claim 8 wherein the deleting includes writing the unlocked status indicator in the lock register.

10. The method of claim 1 further comprising the step of associating two address sets with a plurality of lock registers, where read and write operations directed to the first address set by any processor causes atomic locking and unlocking operations to be performed, and where read and write operations directed to the second address set by a particular subset of the procesors enables inspection without locking and unrestricted loading of lock registers to facilitate initialization and inspection of the state of the lock register array.

11. The method of claim 3 wherein the communication bus includes an address/data bus and a grant bus, the processors, the lock register controller and the resource being connected to the address/data bus, and the processors and lock register controller being connected to the grant bus.

12. The method of claim 11 wherein each one of the plurality of processors is assigned a unique node ID indicator and the node ID indicator of the given processor is obtained from the grant bus by the lock register controller during the read command.

13. The method of claim 12 wherein a bus arbiter controls processor access to the address/data bus according to which of the node ID indicators the arbiter places on the grant bus.

14. The method of claim 13 wherein the lock register controller writes the node ID indicator of the given processor in the lock register as the lock indicator to indicate that the given processor has locked the resource, and when the resource is locked, and the given processor addresses a write command to the lock register, the lock register controller compares the node ID indicator in the lock register with the node ID indicator on the grant bus, and if the node ID indicators match, then the lock register controller deletes the node ID indicator in the lock register to unlock the resource.

15. A resource locking method for use in a data processing system operable with a plurality of processors, a resource which can be used by the processors but requires exclusive use, and a lock register, the processors, resource and register coupled via a communication bus, the lock register being addressable by an address unique to the lock register on the bus, the bus being utilizable in a sequence of bus use intervals, one bus use interval being defined as having a duration beginning from when a given one of the processors accessing the bus issues a read command so as to obtain the contents of the lock register and terminating when that processor receives the contents of the lock register, the method comprising the steps of (a) associating each one of the lock registers with the resource, each resource comprising a record stored in a common memory with the lock registers and (b) in a given bus interval and in response to a read command addressed by a given one of the processors to the lock register's unique address, indicating either (i) that the resource is locked for exclusive use by the given processor and, if locked by an other processor, returning from the lock register an indication to the given processor that the resource is locked by the other processor, and causing the lock to be set in the lock register in the same given interval, if the resource is unlocked at the beginning of the given interval, or (ii) that the resource is not locked for exclusive use by the given processor, if the resource is locked at the beginning of the given interval.

16. The method of claim 15 wherein step (b) is preceded with the step of interposing a lock register controller between the lock register and the bus such that the lock register controller sets the lock in the lock register in response to the read command, within the same given interval.

17. The method of claim 16 wherein the lock register controller indicates on the bus in the given interval that the previously unlocked resource is locked, by the lock register controller placing an unlocked status indicator on the bus within the time interval.

18. A computer system having a resource locking capability, comprising (a) two processor nodes, (b) a plurality of resources, each one thereof comprising a stored record, coupled to the processor nodes and to which each node may seek exclusive access, (c) a plurality of lock registers stored in a common memory with the resources, coupled to the resources and to the processor nodes via a bus, each one of the lock registers being associated with a corresponding one of the resources and addressable by an address unique to the lock register on the bus, and (d) means for responding to a read command issued by a given one of the processors to the unique address of the lock register by assigning or denying exclusive use of the resource to the given one of the processors depending on whether the resource is unlocked or locked at the time the given processor issues the read command, and (e) means for indicating in the lock register that the resource is locked and, if locked by an other processor, returning from the lock register an indication to the given processor that the resource is locked by the other processor, such that, without, such that, without further commands from the given processor, the resource is identified for use only by the given processor.

19. The system of claim 18 further including a lock register controller coupled between the lock register and the processor nodes for controlling the lock register.

20. The system of claim 18 further comprising means for associating two address sets with a plurality of lock registers, where read and write operations directed to the first address set by any processor causes atomic locking and unlocking operations to be performed, and where read and write operations directed to the second address set by a particular subset of the processors enables benign inspection and unrestricted loading of lock registers to facilitate initialization and inspection of the state of the lock register array.

21. The system of claim 20 wherein each of the plurality of processors is assigned a unique node ID indicator.

22. The system of claim 20 wherein the locked and unlocked status of the resource is indicated by the lock register controller with a status indicator.

23. The system of claim 21 wherein the lock register controller is further configured to write the node ID indicator of the given processor in the lock register as the locked indicator to indicate that the given processor has locked the resource.

24. The system of claim 22 wherein the lock register controller is further configured to indicate that the resource is locked by the given processor by the lock register controller placing the status indicator on the bus in response to the read command.

25. The system of claim 22 wherein the resource is indicated to be unlocked by the lock register controller deleting the locked indicator in the lock register.

26. The system of claim 25 wherein the deleting includes writing the status indicator in the lock register.

27. The system of claim 18 further comprising means for associating two address sets with a plurality of lock registers, where read and write operations directed to the first address set by any processor causes atomic locking and unlocking operations to be performed, and where read and write operations directed to the second address set by a particular subset of processors enables inspection without locking and unrestricted loading of lock registers to facilitate initialization and inspection of the state of the lock register array.

28. The system of claim 20 wherein the bus includes an address/data bus and a grant bus, the processors, the lock register controller and the resource being connected to the address/data bus, and the processors and lock register controller being connected to the grant bus.

29. The system of claim 28 wherein each one of the plurality of processors is assigned a unique node ID indicator and the node ID indicator of the given processor is obtained from the grant bus by the lock register controller during the read command.

30. The system of claim 18 further comprising a bus arbiter for controlling processor access to the address/data bus according to which of the node ID indicators the arbiter places on the grant bus.

31. The system of claim 30 wherein the lock register controller is configured to write the node ID indicator of the given processor in the lock register as the lock indicator to indicate that the given processor has locked the resource, and when the resource is locked, and the given processor addresses a write command to the lock register, the lock register controller compares the node ID indicator in the lock register with the node ID indicator on the grant bus, and if the node ID indicators match, then the lock register controller deletes the node ID indicator in the lock register to unlock the resource.

32. A data processing system having resource locking capability, the system comprising a plurality of processors, a resource, comprising a stored record which can be used by the processors and requires exclusive use, and a lock register stored in a common memory with the record, a communication bus, the processors, resource and register coupled via the bus, the lock register being addressable by an address unique to the lock register on the bus, the bus being utilizable in a sequence of bus use intervals, one bus use interval being defined in duration from when a processor granted access to the bus issues a read command to when the processor receives the data it has sought to read, (a) means for associating the lock register with the resource, and (b) means acting in a given bus interval in response to a read command addressed by a given one of the processors to the lock register's unique address for indicating either (i) that the resource is locked for exclusive use by the given processor, and causing the lock to be set in the lock register in the same given interval, if the resource is unlocked at the beginning of the given interval and, if locked by an other processor, returning from the lock register to the given processor an indication that the resource is locked by the other processor, or (ii) that the resource is not locked for exclusive use by the given processor, if the resource is locked at the beginning of the given interval.

33. The system of claim 32 further comprising a lock register controller, the lock register controller interposed between the lock register and the bus so that the lock register controller sets the lock in the lock register in response to the read command, within the same given interval.

34. The system of claim 33 wherein the lock register controller is configured to indicate on the bus in the given interval the locked status of the resource.

35. A computer system having a resource locking capability, comprising (a) a plurality of processor nodes, (b) a plurality of resources, each of such resources comprising a stored record, coupled to and to which the plurality of processor nodes each may seek exclusive access, each processor node identified by a unique node ID vector and the system retaining a status vector, (c) a plurality of lock registers stored in a stored in a common memory with the resources, each one being associated with a corresponding one of the plurality of resources, coupled to the resources and processor nodes, a respective lock register being associated with a respective one of the plurality of resources, and being addressable by an address unique to the respective lock register, and (d) a lock register controller interposed between the lock registers and the processor nodes, and configured to write the node ID vector of a given processor node in a given lock register which the given processor node has addressed with a read command directed to the given lock register's unique address if the status vector is stored in the given lock register, and further configured to communicate the status vector stored in the given lock register to the given processor node to indicate that the resource associated with the given lock register has been locked for exclusive use by the given process node and, if locked by an other processor, returning from the lock register to the given processor, an indication that the resource is locked by the other processor, and further configured to communicate a different vector to the given processor node to indicate that the resource associated with the given lock register has not been locked for exclusive use by the given processor node.

36. The system of claim 35 further including a bus for coupling the processor nodes to the lock register controller and to the resources, the bus being available for the given processor node to perform a read or write communication with the lock register controller, the duration required to complete a given one of the read communications being defined as a bus access interval, such that status of a given resource requiring exclusive access can be changed and communicated by interaction between the lock register controller and the given processor node within a bus access interval.

37. The system of claim 36 wherein the bus comprises a grant bus for identifying a processor node to the lock register controller and a data bus for communicating the read or write communications between the processors and the lock register controller.

38. The system of claim 35 wherein each resource is a segment of memory, and further comprising a memory controller which controls access to each segment of memory, a given processor node communicating with a given segment via the data bus.

39. The system of claim 38 wherein the memory controller and the lock register controller are formed on a single substrate and are coupled to the data bus, with access to the segments of memory being provided via the memory controller.

40. The system of claim 37 further comprising a bus arbiter and an individual request line coupled between the arbiter and each processor node respectively, the bus arbiter coupled to the grant bus and controlling access to the data bus according to which processor node ID the bus arbiter places on the grant bus.

41. The system of claim 35 wherein the lock register controller has the capability of providing access to a single lock register based upon two different address sets.

42. The system of claim 41 wherein the first address set is a read/write segment which enables initialization of the lock registers and the second address set is a lock/unlock segment which enables ID vectors to be written into the lock registers.

43. The system of claim 35 wherein the lock register controller further comprises a latch for storing the node ID vector of a given processor node addressing a given lock register.

44. The system of claim 43 wherein the lock register controller is configured to fetch the contents of the given lock register when the lock register is addressed by the given processor node, and wherein the latch stores the fetched contents of the given lock register.

45. The system of claim 44 wherein the lock register controller further comprises a matching device for comparing the latched node ID vector with the fetched contents of the addressed lock register.

* * * * *